H. C. PETERS.
RESILIENT WHEEL.
APPLICATION FILED APR. 26, 1919.

1,317,097.

Patented Sept. 23, 1919.

Witnesses
W. A. Thomas
T. E. Turpin

Inventor
H. C. Peters

By Victor J. Evans
Attorney

THE COLUMBIA PLANOGRAPH CO., WASHINGTON, D. C.

UNITED STATES PATENT OFFICE.

HENRY C. PETERS, OF NORTH MIDDLETOWN, KENTUCKY.

RESILIENT WHEEL.

1,317,097.

Specification of Letters Patent.   Patented Sept. 23, 1919.

Application filed April 26, 1919.   Serial No. 292,907.

*To all whom it may concern:*

Be it known that I, HENRY C. PETERS, a citizen of the United States, residing at North Middletown, in the county of Bourbon and State of Kentucky, have invented new and useful Improvements in Resilient Wheels, of which the following is a specification.

My present invention pertains to resilient wheels—i. e., wheels constructed with a view to preventing the transmission of shock and jar to vehicles; and it has for its general object to provide a resilient vehicle wheel that is simple and durable in construction and is highly efficient for the purpose stated.

To the attainment of the foregoing, the invention consists in the peculiar and advantageous constructions and adaptation of parts hereinafter described and definitely claimed.

In the accompanying drawings, hereby made a part hereof:

Fig. 3 is a detail section illustrating modified cushioning elements hereinafter specifically referred to.

Figure 1:
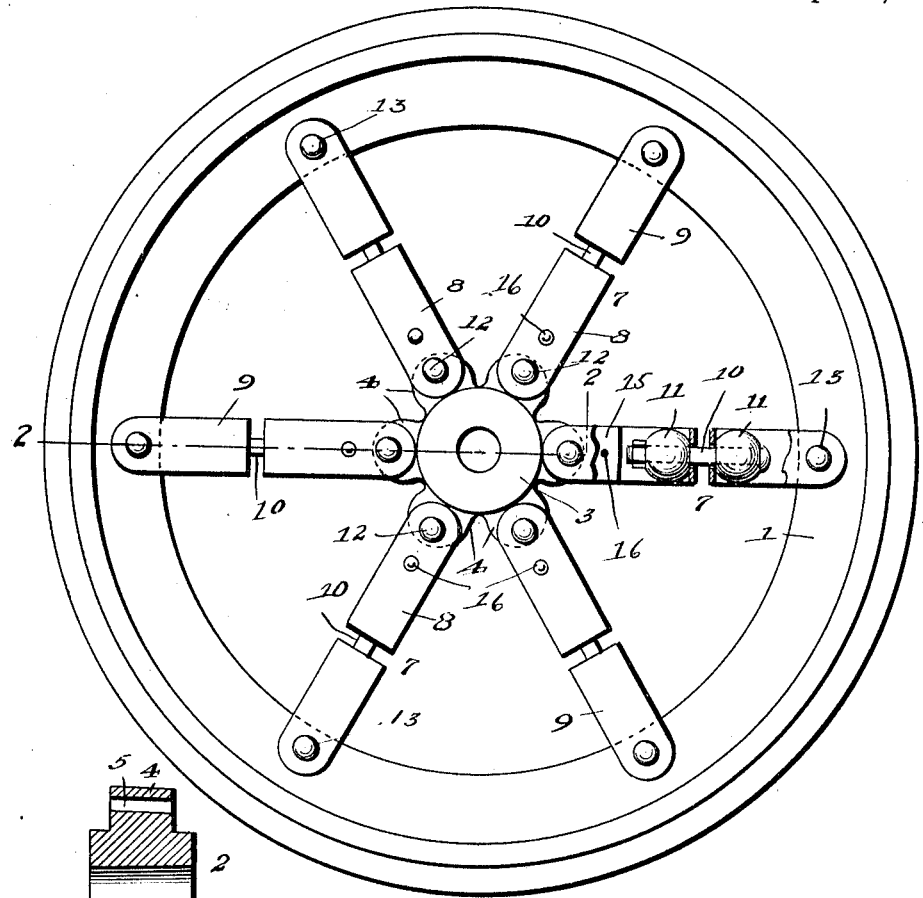
Figure 1 is a side elevation of a resilient wheel constituting the best practical embodiment of my invention that I have as yet devised.
Figure 2:
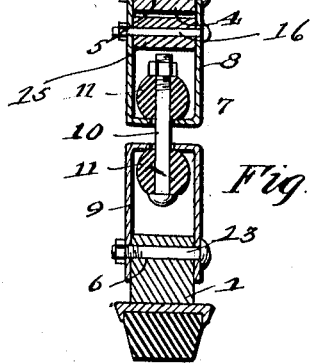
Fig. 2 is a radial, transverse section of the same taken in the plane indicated by the line 2—2 of Fig. 1.

Similar numerals of reference designate corresponding parts in Figs. 1 and 2 to which reference will first be had.

Among other elements my novel wheel comprises a rim 1 and a hub 2. These elements may be of the constructions shown or of any other constructions compatible with the purpose of my invention without involving departure from the scope of the same as defined in my appended claim. I prefer, however, to employ a hub 2 of the construction illustrated—that is to say, a hub having a central apertured body portion 3 and equi-distant, integral arms 4 reaching therefrom. The said hub may be made of wood, metal or any other material, in the discretion of the manufacturer, and in each arm 4 is provided a transverse aperture 5. The rim 1 is also provided at equi-distant points with transverse apertures 6.

Figure 3:
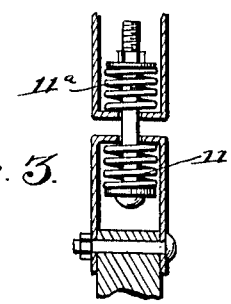

Interposed between the hub 2 and the rim 1 are five spokes 7; the said spokes also being equi-distant as appears in Fig. 1. Each of the said spokes 7 comprises an inner section 8 joined to the hub 2, an outer section 9 joined to the rim 1, a coupling rod 10 extending loosely through adjacent or opposed portions of the sections 8 and 9 and having abutments, and cushions 11 interposed between the said abutments and the opposed portions of the sections 8 and 9. The said cushions may be rubber blocks as appears in Fig. 2, or cushion-springs 11ᵃ as shown in Fig. 3, without affecting my invention. In the present and preferred embodiment of my invention the sections 8 and 9 are formed of straps of sheet steel, in loop shape, and have transverse apertures adjacent to their ends and also have radial apertures in their bights. The said transverse apertures are for the passage of transverse bolts 12 and 13 through which the sections 8 and 9 are pivotally connected to the hub 2 and the rim 1, respectively, while the radial apertures are for the reception of the coupling rods 10, preferably in the form of bolts as shown, with heads on their outer ends and nuts on their inner portions, as shown.

In the practical use of my novel resilient wheel, it will be manifest that incidental to the rotation of the wheel, the hub and the weight imposed upon the axle therein will at all times be yieldingly suspended from the upper portion of the rim 1 through the medium of one of my novel spokes; also, that the said weight will be distributed between the two cushioning devices of the spoke. It will further be observed that any tendency of the hub to fly upwardly will be yieldingly resisted and cushioned by the spoke that is for the time being lowermost. The effect of these operations will be the absolute elimination of shock and jar from the vehicle supported by my novel wheels, no matter how rough the road that is being traversed.

It will be apparent from the foregoing that notwithstanding the practical advantages of my novel wheel, the same is simple and inexpensive in construction and is susceptible of being so made as to enhance rather than detract from the finished appearance of the vehicle.

When deemed expedient, the inner section 8 of each spoke may be provided between its side arms with a section of wood, the said section 15 being connected to the side arms through the medium of one or more bolts 16, as shown in Fig. 2.

Having described my invention, what I claim and desire to secure by Letters-Patent, is:

A resilient wheel comprising a rim, a hub and spokes interposed between and connecting the rim and hub; each of the said spokes being made up of an inner loop-shaped section of metal straddling and pivotally connected to the hub, an outer loop-shaped section of metal straddling and pivotally connected to the rim, a radial coupling rod extending loosely through apertures in the opposed bights of said sections and having abutments disposed in the sections and spaced from said bights, and cushioning devices mounted on the coupling rod and disposed in the sections and interposed between the bights of the sections and the abutments on the rod.

In testimony whereof I affix my signature.

HENRY C. PETERS.

Copies of this patent may be obtained for five cents each, by addressing the "Commissioner of Patents, Washington, D. C."